US012200468B2

(12) United States Patent
Laaksonen

(10) Patent No.: US 12,200,468 B2
(45) Date of Patent: Jan. 14, 2025

(54) INDICATION OF RESPONSIBILITY FOR AUDIO PLAYBACK

(71) Applicant: Nokia Technologies Oy, Espoo (FI)

(72) Inventor: Lasse Juhani Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 285 days.

(21) Appl. No.: 17/573,953

(22) Filed: Jan. 12, 2022

(65) Prior Publication Data
US 2022/0232340 A1 Jul. 21, 2022

(30) Foreign Application Priority Data

Jan. 19, 2021 (EP) .................................. 21152210

(51) Int. Cl.
H04S 7/00 (2006.01)
G06F 3/16 (2006.01)

(52) U.S. Cl.
CPC .............. H04S 7/304 (2013.01); G06F 3/165 (2013.01); H04S 2400/11 (2013.01); H04S 2420/01 (2013.01)

(58) Field of Classification Search
CPC .. H04S 7/304; H04S 2400/11; H04S 2420/01; H04S 2400/13; H04S 7/30; H04S 7/00; G06F 3/165; G06F 3/162; G06F 3/16
See application file for complete search history.

(56) References Cited

U.S. PATENT DOCUMENTS 10,194,259 B1 1/2019 Martin et al.
10,585,486 B2 3/2020 Coleman et al.
2003/0177893 A1* 9/2003 Takeuchi ................. G10H 1/46
    84/626
2008/0137268 A1 6/2008 Mayette et al. ............ 361/679
2011/0153044 A1 6/2011 Lindahl et al.
2013/0003998 A1 1/2013 Kirkeby et al.
2018/0206058 A1 7/2018 Murata et al.
2019/0320282 A1 10/2019 Moeller
2020/0099792 A1 3/2020 Nguyen et al.
2020/0154231 A1 5/2020 Eronen et al.
2020/0186953 A1 6/2020 Mate et al. ....................... 7/303

FOREIGN PATENT DOCUMENTS

CN 105684467 A 6/2016
EP 3287868 A1 2/2018
(Continued)

OTHER PUBLICATIONS

Goetz Lawrence : "Testmyspeaker.com-test speaker for volume and balance" Dec. 5, 2020.*

(Continued)

Primary Examiner — Yosef K Laekemariam
(74) Attorney, Agent, or Firm — McCarter & English, LLP

(57) ABSTRACT

According to various, but not necessarily all, embodiments there is provided an apparatus comprising means for causing a user-perceivable indication that an audio playback device is responsible for playback of audio content received from a user device by temporarily rendering the audio content with at least one spatial characteristic which cannot be reproduced by at least one other audio playback device connected to the user device.

22 Claims, 8 Drawing Sheets

(56) References Cited

FOREIGN PATENT DOCUMENTS

EP 3327677 A1 5/2018
EP 3422743 A1 1/2019

OTHER PUBLICATIONS

Silva et al., "Choosing audio devices on the basis of listeners' spatial perception: A case study of Headphones vs in-Earphones", IEEE 6th International Conference on Consumer Electronics—Berlin (ICCE-Berlin), Sep. 5-7, 2016, 4 pages.
Extended European Search Report received for corresponding European Patent Application No. 21152210.7, dated Jul. 15, 2021, 10 pages.
"TestMySpeakers.com—Test speakers for volume and balance", TestMySpeakers.com, Retrieved on Jan. 12, 2022, Webpage available at : http://www.testmyspeakers.com/.

\* cited by examiner

INDICATION OF RESPONSIBILITY FOR AUDIO PLAYBACK

RELATED APPLICATION

This application claims priority to the European patent application number 21152210.7, filed on Jan. 19, 2021, the content of which is incorporated herein by reference in its entirety.

TECHNOLOGICAL FIELD

Embodiments of the present disclosure relate to causing an indication of responsibility for audio playback. Some embodiments relate to causing an indication of responsibility for audio playback when multiple audio playback devices are connected to a user device from which the audio content is received.

BACKGROUND

When responsibility for playback of audio content is switched between audio playback devices the newly responsible audio playback device may play an introductory sound, such as a beep or voice prompt, unrelated to the audio content which it is responsible for playing back.

Some audio playback devices are capable of spatial audio reproduction. Spatial audio reproduction places sound sources in a three-dimensional space with the intention of a listener being able to hear specific sounds from specific directions.

Spatial audio reproduction can be performed for audio content formatted as, for example: metadata-assisted spatial audio (MASA), object-based audio, channel-based audio (e.g., 5.1 or 7.1+4), non-parametric scene-based audio (e.g., First-order Ambisonics, Higher-order Ambisonics), or combinations of these formats. Audio content in these formats can be spatialised for the user using a spatial audio codec such as Immersive Voice and Audio Services (IVAS) and a suitable renderer (e.g., IVAS internal renderer). For headphone listening, the spatialisation comprises binauralisation.

BRIEF SUMMARY

According to various, but not necessarily all, embodiments there is provided an apparatus comprising means for causing a user-perceivable indication that an audio playback device is responsible for playback of audio content received from a user device by temporarily rendering the audio content with at least one spatial characteristic which cannot be reproduced by at least one other audio playback device connected to the user device.

According to various, but not necessarily all, embodiments there is provided a method comprising causing a user-perceivable indication that an audio playback device is responsible for playback of audio content received from a user device by temporarily rendering the audio content with at least one spatial characteristic which cannot be reproduced by at least one other audio playback device connected to the user device.

According to various, but not necessarily all, embodiments there is provided a computer program that, when run on a computer, performs causing a user-perceivable indication that an audio playback device is responsible for playback of audio content received from a user device by temporarily rendering the audio content with at least one spatial characteristic which cannot be reproduced by at least one other audio playback device connected to the user device.

The following portion of this 'Brief Summary' section, describes various features that may be features of any of the embodiments described in the foregoing portion of the 'Brief Summary' section. The description of a function should additionally be considered to also disclose any means suitable for performing that function.

Temporarily rendering the audio content with the at least one spatial characteristic may comprise temporarily adjusting rendering of the audio content so that it is rendered with the at least one spatial characteristic Temporarily rendering the audio content with the at least one spatial characteristic may comprise temporarily modifying the audio content so that it has the at least one spatial characteristic.

Temporarily rendering the audio content with the at least one spatial characteristic may be configured to increase energy that a user will perceive to be originating from at least one direction away from the at least one other audio playback device relative to energy that a user will perceive to be originating from one or more directions corresponding to one or more positions of the at least one other audio playback device.

The at least one direction away from the at least one other audio playback device may be a direction in which there is no real sound source associated with the at least one other audio playback device and no possible virtual sound source associated with the at least one other audio playback device.

Temporarily rendering the audio content with the at least one spatial characteristic may comprise causing an above-threshold amount of the total energy of the audio content to be directed from at least one direction away from the at least one other audio playback device.

The user-perceivable indication may be discontinued after directing an above-threshold amount of the total energy of the audio content into two or more successive directions, at least one of which is the at least one direction away from the at least one other audio playback device.

Temporarily rendering the audio content with the at least one spatial characteristic may comprise repositioning one or more audio objects into the at least one direction away from the at least one other audio playback device.

Temporarily rendering the audio content with the at least one spatial characteristic may comprise converting at least one diffuse component of the audio content into directional audio in the at least one direction away from the at least one other audio playback device.

Temporarily rendering the audio content with the at least one spatial characteristic may comprise converting at least one directional component of the audio content in a direction corresponding to a position of another audio playback device into diffuse audio.

Temporarily rendering the audio content with the at least one spatial characteristic may comprise decreasing the energy of at least one directional component of the audio content in a direction corresponding to a position of the at least one other audio playback device and/or increasing the energy of at least one directional component of the audio content in the at least one direction away from the at least one other audio playback device.

Temporarily rendering the audio content with the at least one spatial characteristic may comprise rendering spatial audio components in mono or stereo format.

The audio content may be temporarily rendered with the at least one spatial characteristic in response to a change of responsibility for playback of the audio content among audio playback devices connected to the user device The audio content may be temporarily rendered with the at least one spatial characteristic in response to a user request for confirmation that the audio playback device is responsible for playback of the audio content.

Components of the audio content flagged in associated metadata as being components which should not be modified may not be modified.

According to various, but not necessarily all, embodiments there is provided examples as claimed in the appended claims. The scope of protection sought for various embodiments of the invention is set out by the independent claims. The examples and features, if any, described in this specification that do not fall under the scope of the independent claims are to be interpreted as examples useful for understanding various embodiments of the invention.

BRIEF DESCRIPTION

Some examples will now be described with reference to the accompanying drawings in which:

FIGS. 1A, B show an example of subject matter described herein;

Figures 15A, 15B:
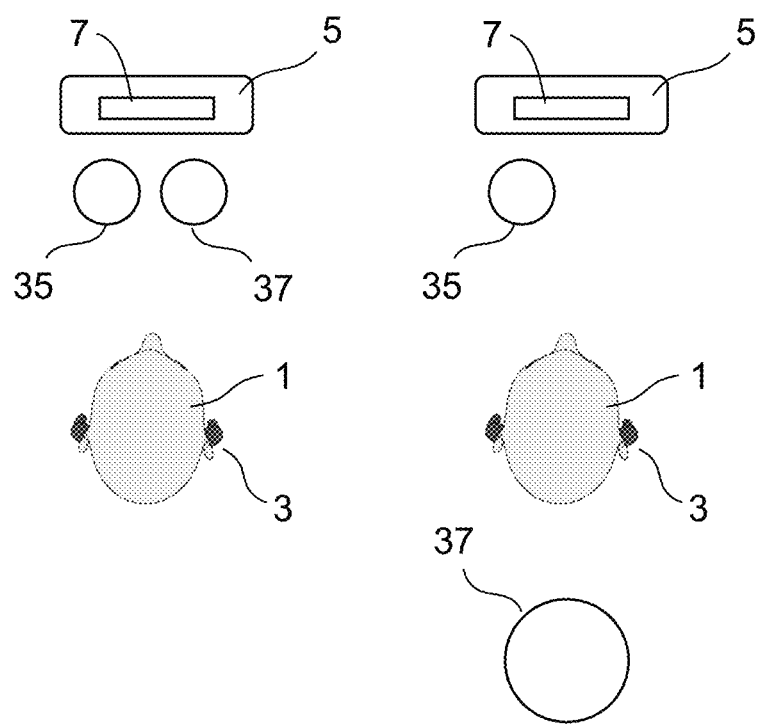

FIGS. 15A, B show an example of subject matter described herein; and

Figure 16:
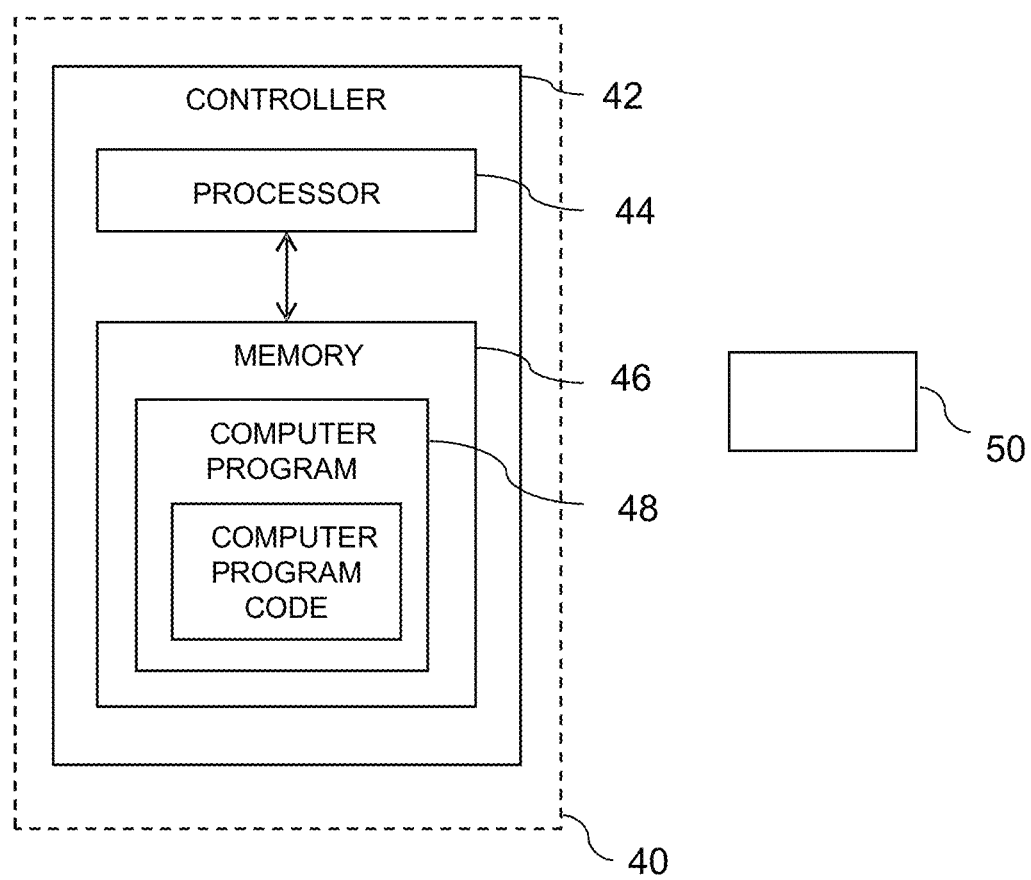

FIG. 16 shows an example apparatus described herein.

DETAILED DESCRIPTION

The following description describes apparatus, methods, and computer programs that indicate to a user 1 that an audio playback device 3 is responsible for playback of audio content that they hear. In particular, this is achieved by temporarily rendering the audio content with at least one spatial characteristic which may be associated, by the user 1, with the audio playback device 3.

The audio playback device 3 is any device capable of transducing audio—an electrical signal, either digital or analog, that represents sound—into sound—a pressure wave propagating through a medium. Audio content is information that, once transduced into sound, the user 1 can hear. Playback of audio content comprises transducing the audio content into sound so that the user 1 can hear this information.

Figures 1A, 1B:
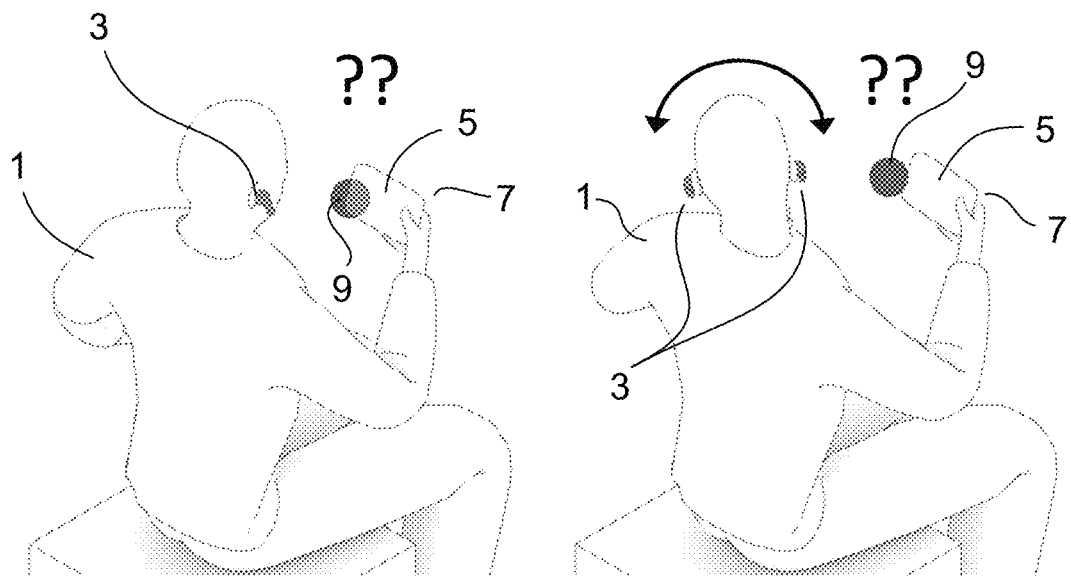

FIGS. 1A and 1B illustrate an example of a situation in which there are two audio playback devices 3, 7 in the vicinity of the user 1. In this example the user is wearing headphones 3 and holding a user device 5 having an integrated loudspeaker 7. The user device may be an electronic communications device.

If the audio consists of non-spatial (head-locked) audio, then the user 1 is able to ascertain which of the audio playback devices—the headphones 3 or the integrated loudspeaker 7—is responsible for the playback by moving their head relative to the user device 5. The apparent sound source 9 of the audio content will appear to move with the user's head if the headphones 3 are responsible for playback, whereas the apparent sound source 9 of the audio content will not move with the user's head if the integrated loudspeaker 7 is responsible for playback.

There may of course be multiple apparent sound sources of the audio content, corresponding respectively to different components of the audio content. In such cases, each of the multiple apparent sound sources will appear to uniformly move with the user's head when playback is via the headphones 3 whereas when playback is via the integrated loudspeaker 7 this will not be observed.

If, on the other hand, the audio comprises at least some spatial audio components, then the user 1 is not able to ascertain which of the audio playback devices—the headphones 3 or the integrated loudspeaker 7—is responsible for the playback by moving their head relative to the user device 5. Whether the headphones 3 or the integrated loudspeaker 7 is responsible for playback of the audio content that the user 1 hears, the apparent sound source 9 of the audio content, or at least of some components, will not move. Accordingly, the user 1 can become confused as to which audio playback device 3, 7 is responsible for playback of the audio content that they hear.

In some examples where the audio content accompanies visual content, the majority of the audio content (e.g., main dialogue) may be reproduced from the direction where the visual content is displayed. This may be at the user device 5, and thus broadly in the same direction as the integrated loudspeaker 7. This can lead the user 1 to believing that the integrated loudspeaker 7 is responsible for the playback of the audio content that they hear even when it is in fact the headphones 3 which are responsible for the playback.

Figure 2:
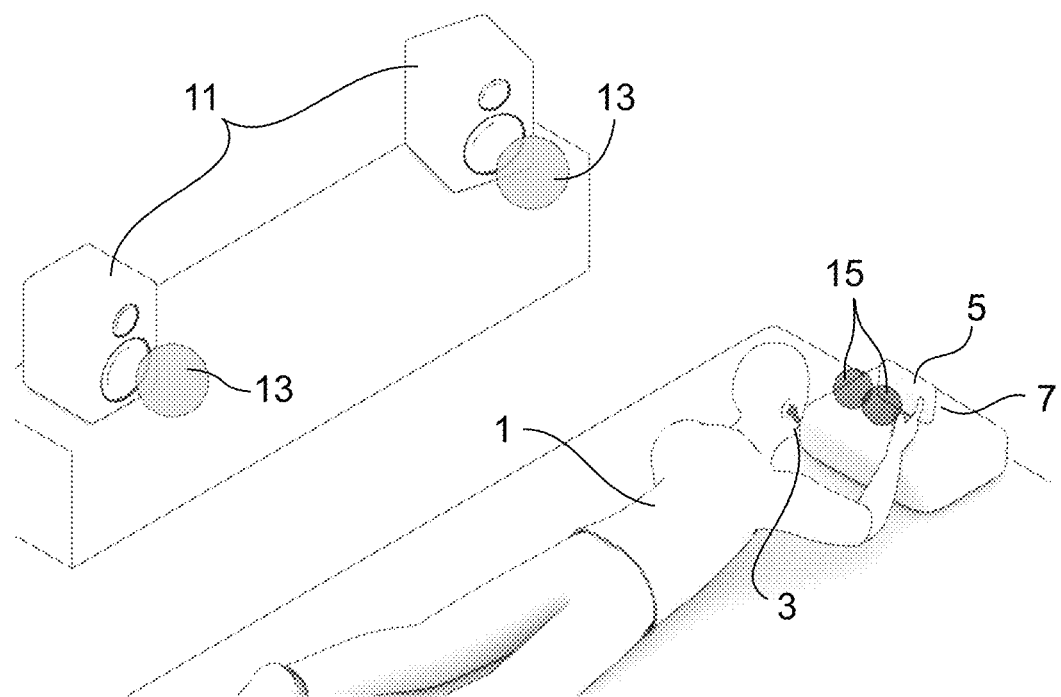
FIG. 2 shows another example of subject matter described herein.

It may be harder for the user 1 to ascertain which audio playback device in their vicinity is responsible for playback of the audio content that they hear when there are more audio playback devices in their vicinity. FIG. 2 illustrates an example of a situation in which there are more than two audio playback devices. In FIG. 2, not only is the user wearing headphones 3 and holding a user device 5 having an integrated loudspeaker 7 (as in FIGS. 1A and 1B), but there is also a loudspeaker system 11 in the same room as the user 1 which could be used to playback the audio content. The loudspeaker system 11 may be more capable of reproducing spatial audio effects or capable of reproducing a greater variety of spatial audio effects than the integrated loudspeaker 7. Accordingly, even if a significant amount of the audio content is not reproduced from the direction of the user device 5 (where, for example, accompanying visual content may be displayed), the user 1 may still have difficulty in determining which of the loudspeaker system 11 and the headphones 3 is responsible for playback of the audio content. For example, the location of apparent sound sources 13 proximate the loudspeaker system 11 could be the result of playback by either the headphones 3 or the loudspeaker system 11.

It will be appreciated that if the majority of audio content is reproduced from the direction of the user device 5—as it might be in the case where the audio content comprises dialogue accompanying visual content displayed at the user device 5—it will be difficult for the user 1 to distinguish even between the playback by the loudspeaker system 11 and playback by the integrated loudspeaker 7 of the user device 5. For example, the location of apparent sound sources 15 proximate the user device 5 could be the result of playback by either the headphones 3, the integrated loudspeaker 7, or the loudspeaker system 11. Thus, the problem is not limited to ascertaining whether headphones 3 are responsible for playback; rather the problem is relevant to all audio playback devices 3, 7, 11.

There are multiple disadvantages to the user 1 if they cannot easily ascertain which audio playback device 3, 7, 11 in their vicinity is responsible for playback of the audio content that they hear. For example: the user 1 may become confused; the user 1 may unintentionally allow playback of private (e.g., confidential, embarrassing, etc.) audio content, such as private communication calls, in a manner that is public; the user 1 may unintentionally disturb other people in the vicinity with public playback of audio content; the user 1 may be unaware that a wireless connection between the user device 5 and other devices such as the audio playback device 3 has dropped since in some cases that playback will resume, uninterrupted, via an integrated loudspeaker 7 of the user device 5; the user 1 may be frustrated or distracted by perceived unresponsiveness of an audio playback device 3 to adjustments (e.g., volume, etc.), unaware that the perceived unresponsiveness is due to the audio playback device 3 not being responsible for playback of the audio content that they hear.

Figure 3:
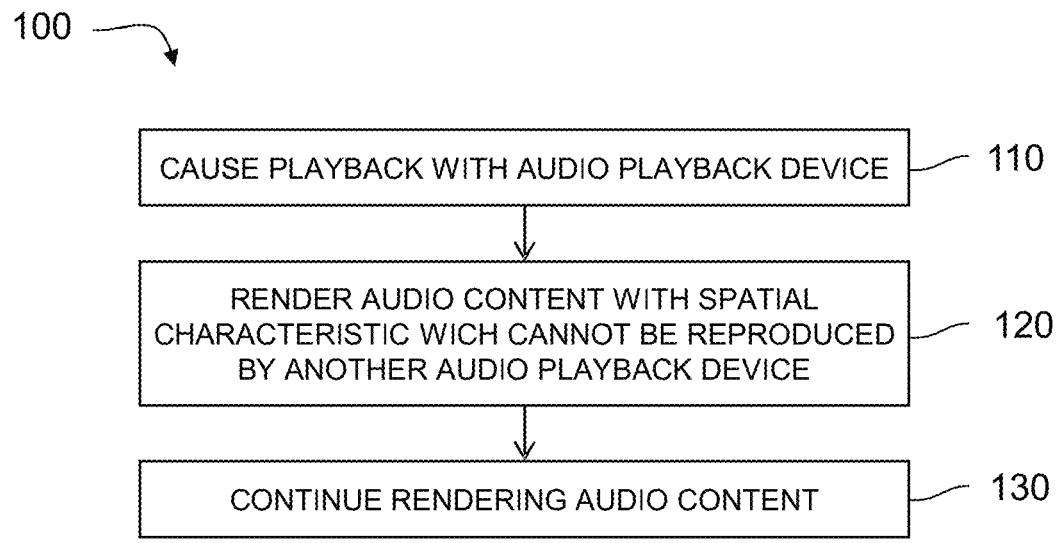
FIG. 3 shows an example method described herein.

FIG. 3 illustrates an example of a method 100 for enabling the user 1 to ascertain that an audio playback device 3 is responsible for playback of audio content that they hear.

Playback of audio content by an audio playback device 3 is caused in block 110. The audio playback device 3 receives audio content from a user device 5 at which the user 1 can control the audio content which is to be played back. This may involve selecting a media file stored at the user device 5 or remotely and accessed via the user device 5. The user device 5 may also be configured to enable the user 1 to control which audio playback device 3, 7, 11 connected to the user device 5 should play back the audio content. Connected, in this instance, means that exchange of data between devices is enabled. This exchange of data may be made by wired or wireless link.

The method 100 comprises causing a user-perceivable indication that the audio playback device 3 is responsible for playback of audio content received from the user device 5 by temporarily rendering the audio content with at least one spatial characteristic which cannot be reproduced by at least one other audio playback device 7, 11 connected to the user device 5, as shown in block 120.

Accordingly, the user-perceivable indication that is caused, while audible in form, is not necessarily a sound which diverges from what the user 1 expects, but may be an unexpected spatialisation of an expected sound. The at least one spatial characteristic may be applied to existing information recorded in the audio content so that, within a sound scene perceived by the user 1, this information appears to be misplaced. The user-perceivable indication does not try to recreate a realistic sound experience for the user 1, as may be intended by the original composer of the audio content, but provides a distinctive deviation from this. In this way the user 1 may perceive that the sound has changed in a manner that would not or could not be reproduced by another audio playback device 7, 11 connected to the user device 5 besides the audio playback device 3 which is in fact responsible for the playback.

The user-perceivable indication may be an indication that the audio playback device 3 is newly responsible for playback of the audio content, the responsibility for playback having just been changed from another audio playback device 7, 11 to the audio playback device 3, for example based on a user's choice communicated to the user device 5. Accordingly, in some examples the method 100 comprises temporarily rendering the audio content with the at least one spatial characteristic in response to a change of responsibility for playback of the audio content among audio playback devices 3, 7, 11 connected to the user device 5.

Figure 4:
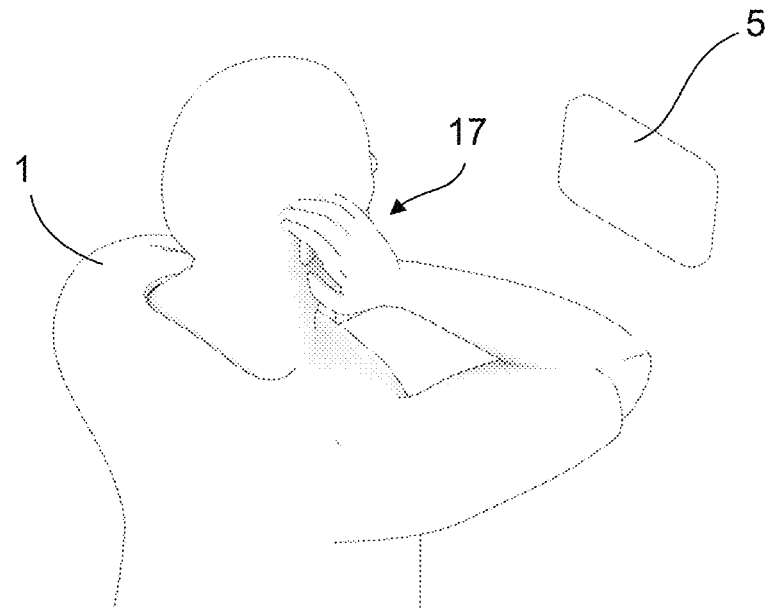
FIG. 4 shows an example of subject matter described herein.

Alternatively, the user-perceivable indication may be an indication that the audio playback device 3 has been and remains responsible for playback of the audio content. Accordingly, in some examples the method 100 comprises temporarily rendering the audio content with the at least one spatial characteristic in response to a user request for confirmation that the audio playback device 3 is responsible for playback of the audio content. The user request for confirmation may comprise a predetermined gesture 17 such as illustrated in FIG. 4. The predetermined gesture 17 may, as illustrated, comprise cupping one or both of their ears, and any headphone speakers they may be wearing, with one or both hands. Such a gesture 17 may be intuitive, reflecting actions taken by a user 1 to block out unwanted sounds. If the user 1 is wearing headphones 3, they may be adapted to detect this gesture 17. For example, the headphones 3 may comprise sensors for detecting this blocking gesture 17. The user-perceivable indication may last for as long as user 1 performs this gesture 17.

Returning to discussion of FIG. 3, in some examples the at least one spatial characteristic with which the audio content is temporarily rendered cannot be reproduced by the one or more other audio playback devices 7, 11 connected to the user device 5 which have different spatial audio capabilities. For example, where the audio playback device 3 has the capability of producing full-sphere surround sound and the one or more other audio playback devices 7, 11 are limited to at most planar surround sound, the at least one spatial characteristic may be the audio content having an apparent sound source 9 at a location outside of the plane such as above the user's head. In another example, where the one or more other audio playback devices 7, 11 are capable of full-sphere surround sound, the at least one spatial characteristic may be the perceived head-internalisation of the apparent sound source 9 of the audio content by rendering the audio content in mono or stereo format.

The distinctiveness of the at least one spatial characteristic may not be limited to consideration of only the one or more other audio playback devices 7, 11 connected to the user device 5. In some examples the at least one spatial characteristic can be one which additionally cannot be reproduced by other audio playback devices in the vicinity or at least those in the vicinity which have previously been connected to the user device 5. Being in the vicinity may be understood as being in the same room or in another common acoustic environment.

Since the user-perceivable indication is temporary, playback of the audio content continues thereafter as per block 130.

The user-perceivable indication, by means of the temporary rendering of the audio content with the at least one spatial characteristic, has a finite duration. The duration may be predetermined. The duration may be a number of seconds or any other suitable length for enabling a user 1 to become aware that the deviation from a realistic sound experience or the intended spatialisation is deliberate and not simply a glitch. Alternatively, the duration may be based on the audio content. For example, the duration may be determined as some percentage of the duration of the audio content. This percentage may reduce as the duration of the audio content increases. For audio content with a duration of under one minute, the percentage may be, for example, 10%, whereas for audio content with a duration closer to an hour, the percentage may be, for example, closer to 1%. In either case, the duration of the user-perceivable indication, by means of the temporary rendering of the audio content with the at least one spatial characteristic, is shorter than that of the audio content.

In some examples the user-perceivable indication can be discontinued in response to user input, such as a gesture, acknowledging the user-perceivable indication. In absence of such user input acknowledging the user-perceivable indication, the user-perceivable indication may continue for longer or the temporary rendering may be configured to further emphasise the at least one spatial characteristic or other spatial characteristics which also cannot be reproduced by at least one other audio playback device 7, 11 connected to the user device 5. For example, if at first only a subset of components of the audio content (for example, one or more audio objects or one or more frequencies) is rendered with the at least one spatial characteristic, in the absence of such user input acknowledging the user-perceivable indication, more and even in some examples all components of the audio content may be rendered with the at least one spatial characteristic.

As playback continues, as per block 130, the audio content is rendered with its intended spatialisation. The intended spatialisation of the audio content can be recorded, e.g., in associated metadata. The intended spatialisation can also be recorded in the channel order for channel-based audio.

It is to be understood that audio content's intended spatialisation may, subsequent to cessation of the user-perceivable indication, have spatial characteristics which cannot be achieved by the at least one other audio playback device 7, 11 connected to the user device 5, however these spatial characteristics would not be unexpected for the user 1 in view of the audio content and do not result from consideration of the playback capabilities 212, 214 (see FIG. 5) of the at least one other audio playback device 7, 11 and, in particular, consideration of which playback capabilities 212, 214 they do not have that the audio playback device 3, responsible for playback of the audio content during this time, does have.

Alternatively, if no user input acknowledging the user-perceivable indication is provided, the audio presentation may be switched to regular stereo presentation.

By causing this user-perceivable indication: the user 1 can resolve confusion with regards to which audio playback device 3, 7, 11 is responsible for playback of the audio content that they hear; the user 1 can determine that the playback of private (e.g., confidential, embarrassing, etc.) audio content remains private; the user 1 can be made aware that a wireless connection between the user device 5 and other devices such as the audio playback device 3 has not dropped; the user 1 is able to confirm that a correct spatialisation mode is used by the audio playback device 3; the user 1 is not distracted from the audio content by the addition of new sounds such as loud beeps or voice prompts nor from accompanying visual content, if any, by visual overlays for the purpose of indicating to the user 1 which audio playback device 3, 7, 11 is responsible for playback; the user 1 does not need to deactivate or disconnect audio playback devices 3, 7, 11 to check which is responsible for playback using a process of elimination, which process would create an unnecessary discontinuity in the audio content perceived by the user 1.

Figure 5:
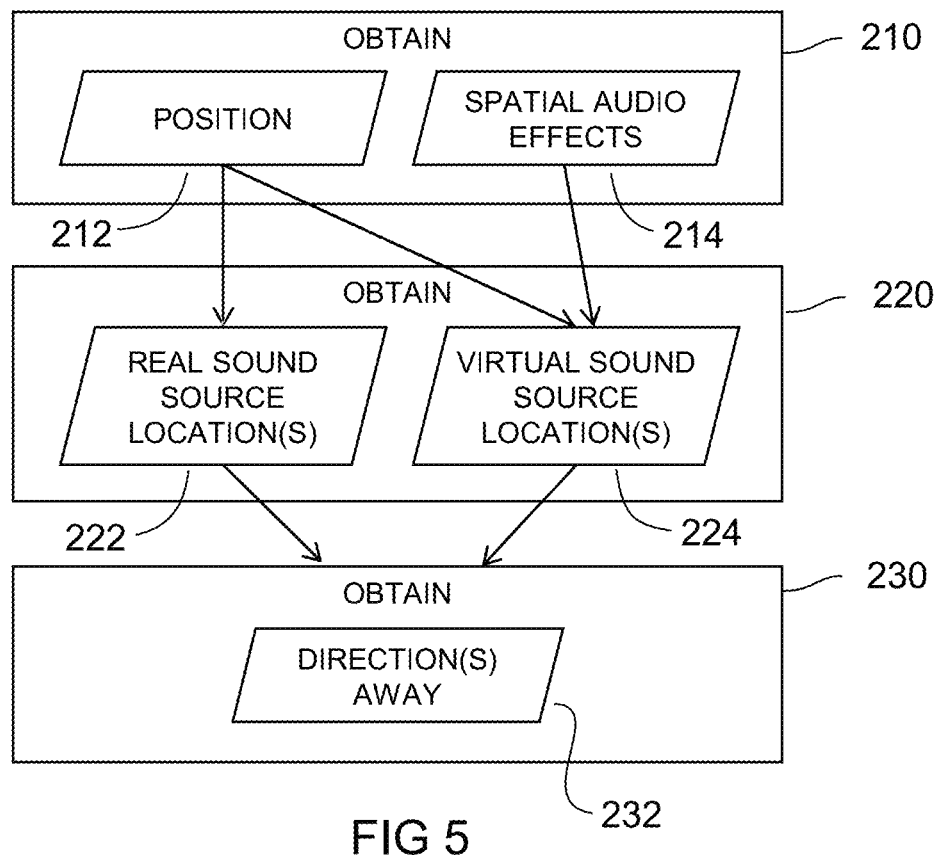
FIG. 5 shows another example method described herein.

FIG. 5 illustrates an example in which knowledge of the playback capabilities 212, 214 of the at least one other audio playback device 7, 11 connected to the user device 5 is obtained for the purpose of determining the at least one spatial characteristic with which the audio content is to be temporarily rendered to indicate to the user 1 that the audio playback device 3 is responsible for playback of the audio content.

At block 210 information on playback capabilities of the at least one other audio playback device 7, 11 connected to the user device 5 is obtained. This can involve obtaining information on one or more positions 212 of the at least one other audio playback device 7, 11. The one or more positions 212 of the at least one other audio playback device 7, 11 can be obtained by any suitable means such as, for example: radio locating using ultra-wideband positioning; computer vision using a camera of the user device 5; or acoustic measurements such as those used by some audio playback devices to optimise performance in view of room acoustics. Such acoustic measurements can be made using a dedicated microphone or one or more microphones housed within the at least one other audio playback device 7, 11. In examples where the at least one other audio playback device 7, 11 has one or more predictable position 212, such as a loudspeaker unit in a surround sound system, these can be saved for future use.

Obtaining information of playback capabilities 212, 214 of the at least one other audio playback device 7, 11 can additionally involve obtaining information on spatial audio effects 214, if any, that can be produced by the at least one other audio playback device 7, 11. This information 214 may be communicated by the at least one other audio playback device 7, 11.

Based on the one or more positions 212 of the at least one other audio playback device 7, 11, one or more direction of one or more real sound sources 222 from the perspective of the user 1 can be obtained, as per block 220.

Based on the one or more positions 212 of the at least one other audio playback device 7, 11 and spatial audio effects 214 that can be produced by the at least one other audio playback device 7, 11, one or more directions of one or more possible virtual sound sources 224 from the perspective of the user 1 can be obtained, also as per block 220.

The perspective of the user 1 can be determined based on the position of the user 1 relative to user device 5 which can be obtained by any suitable means such as, for example, time of flight radio wave measurement or computer vision.

At block 230 information is obtained on at least one direction 232 in which there are no real sound sources associated with the at least one other audio playback device 7, 11 and no possible virtual sound sources associated with the at least one other audio playback device 7, 11. Thus, the at least one direction 232 is determined based on the one or more directions of one or more real sound sources 222 and one or more possible virtual sound sources 224, if any, from the perspective of the user 1.

It is to be appreciated that obtaining playback capabilities 212, 214 may in some examples involve obtaining information on the one or more positions 212 of the at least one other audio playback device 7, 11 and accordingly obtaining information on the one or more directions of one or more real sound sources 222 and not obtaining information on spatial audio effects 214, if any, that can be produced by the at least one other audio playback device nor accordingly obtaining information on the direction of possible virtual sound sources 224. Thus, in some examples, at block 230, information is obtained on at least one direction 232 in which there is no real sound source. In such example the at least one direction 232 which is obtained is at least one direction away from the at least one other audio playback device 7, 11.

FIGS. 6 to 14 illustrate examples of the at least one spatial characteristic with which the audio content is temporarily rendered to indicate to the user 1 that the audio playback device 3 is responsible for playback of the audio content.

In each of these examples, temporarily rendering the audio content with the at least one spatial characteristic can comprise either: temporarily adjusting rendering of the audio content so that it is rendered with the at least one spatial characteristic; or temporarily modifying the audio content so that it has the at least one spatial characteristic.

For different components of the audio content, the spatial characteristic with which they may be rendered can be different. Therefore, in some examples, the spatial characteristic is content dependent.

In the examples of FIGS. 6 to 13, temporarily rendering the audio content with the at least one spatial characteristic is configured to increase energy that a user 1 will perceive to be originating from at least one direction 232 away from the at least one other audio playback device 7, 11 relative to energy that a user 1 will perceive to be originating from one or more directions corresponding to one or more positions 212 of the at least one other audio playback device 7, 11.

In some examples the relative energies perceived to be originating from the at least one direction 232 away from the at least one other audio playback device and from one or more directions corresponding to one or more positions 212 of the at least one other audio playback device 7, 11 are varied, during the user-perceivable indication, in respect of one or more frequencies or frequencies bands, and not necessarily across the full spectrum.

In some examples the at least one direction 232 away from the other audio playback devices 7, 11 is a direction in which there is no real sound source associated with the at least one other audio playback device 7, 11. It may also be in a direction in which there are no possible virtual sound sources associated with the at least one other audio playback device 7, 11.

Figure 6:
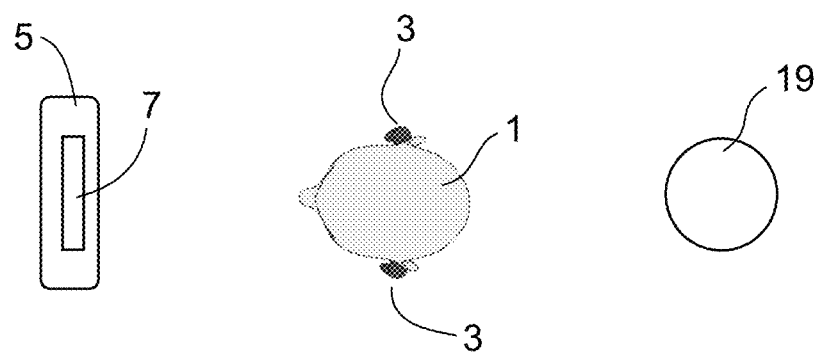
FIG. 6 shows an example of subject matter described herein.

FIG. 6 illustrates an example in which an above-threshold amount of the total energy of the audio content is perceived to originate from the at least one direction 232 away from the at least one other audio playback device 7, 11. The apparent sound source 19 of an above-threshold amount of the total energy of the audio content is located in the at least one direction 232 away from the at least one other audio playback device 7, 11.

An above-threshold amount of the total energy of the audio content having an apparent sound source 19 located in the at least one direction 232 away from the at least one other audio playback device 7, 11 is an example of a spatial characteristic which cannot be reproduced by the at least one other audio playback device 7, 11.

In example illustrated in FIG. 6 the user 1 is wearing headphones 3 and the user device 5 is positioned in front of them. The audio playback device responsible for playback of the audio content is the headphones 3. The other audio playback device connected to the user device 5 is the integrated loudspeaker 7 of the user device 5. The apparent sound source 19 for an above-threshold amount of the total energy of the audio content is located behind the user 1. Thus, an above-threshold amount of the total energy of the audio content is perceived to originate from the opposite side of the user's head as compared to the relative position of integrated loudspeaker 7 with respect to the user 1.

In this example, the apparent sound source 19 for an above-threshold amount of the total energy of the audio content is located where there are no real or possible virtual sound sources associated with the integrated loudspeaker 7. In general, temporarily rendering the audio content with the at least one spatial characteristic can comprise causing above-threshold amount of the total energy of the audio content to be perceived as originating from the at least one direction 232 in which there are located no real sound sources associated with the at least one other audio playback device 7, 11 connected to the user device 5 and no possible virtual sound sources associated with the at least one other audio playback device 7, 11 connected to the user device 5.

An above-threshold amount can refer to a majority. In some examples, the threshold may be higher. The threshold may be 70%. Temporarily rendering the audio content with the at least one spatial characteristic may comprise causing 70%, or more, of the total energy of the audio content to be perceived as originating from the at least one direction 232 away from the at least one other audio playback device 7, 11, such as the integrated loudspeaker 7.

In some examples an above-threshold amount of the total energy of the audio content may be concentrated in one direction in the intended spatialisation of the audio content or otherwise concentrated in directional components of the audio content. For example, the audio content may comprise one or more audio objects. Temporarily rendering the audio content with the at least one spatial characteristic can therefore comprise repositioning one or more audio objects into the at least one direction 232 away from the at least one other audio playback device 7, 11.

For one or more directional components of the audio content (such as audio objects) that are repositioned into the at least one direction away from the at least one other audio playback device 7, 11, all or substantially all of the energy of these components can be caused to have a perceived origin from the at least one direction 232 away from the at least one other audio playback device 7, 11. The above-threshold amount of the total energy of the audio content may comprise all or substantially all of the energy of one or more directional components of the audio content. Where the one or more directional components represent direct sounds, all or substantially all of their energy may be concentrated in the at least one direction 232 away from the at least one other audio playback device 7, 11. Where the one or more directional components represent reflected sounds or late reverb for example, their energy may be spread around the at least one direction 232 away from the at least one other audio playback device 7, 11.

Figure 7:
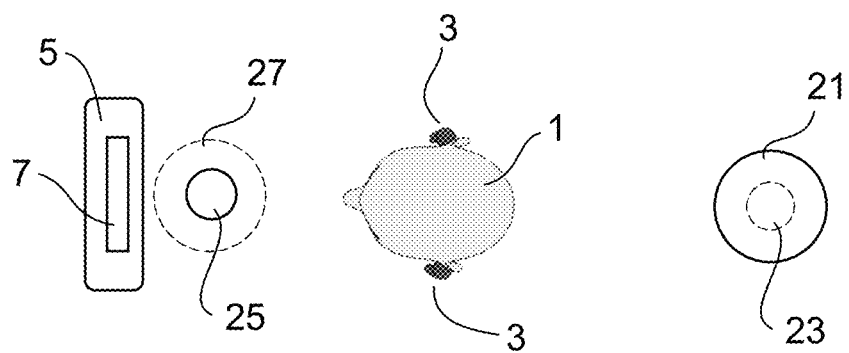
FIG. 7 shows an example of subject matter described herein.

Alternatively, temporarily rendering the audio content with the at least one spatial characteristic can comprise decreasing the energy of at least one directional component of the audio content in a direction corresponding to a position of the at least one other audio playback device 7, 11 and/or increasing the energy of at least one directional component of the audio content in the at least one direction 232 away from the at least one other audio playback devices 7, 11, as shown in FIG. 7.

In the example of FIG. 7 the apparent sound source 21 for component of the audio content behind the user 1 during the user-perceivable indication has more energy (indicated by a larger circle) than the apparent sound source 23 for component of the audio content behind the user 1 in the intended spatialisation. On the other hand, the apparent sound source 25 for component of the audio content in front of the user 1 during the user-perceivable indication has less energy (indicated by a smaller circle) than the apparent sound source 27 for component of the audio content in front of the user 1 in the intended spatialisation.

Figure 8:
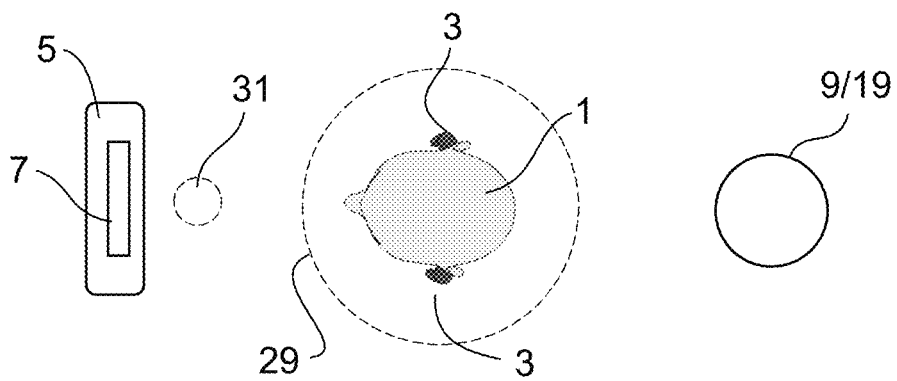
FIG. 8 shows an example of subject matter described herein.

In other examples, as illustrated in FIG. 8, the directional properties of diffuse components 29 of the audio content can be increased and directed into the at least one direction 232 away from the at least one other audio playback device 7, 11. For example, the direct-to-total energy ratio of diffuse components 29 in case of IVAS MASA content can be increased.

That is, temporarily rendering the audio content with the at least one spatial characteristic can comprise converting at least one diffuse component 29 of the audio content into directional audio from the at least one direction 232 away from the at least one other audio playback device 7, 11.

As shown in FIG. 8, this can be performed in conjunction with repositioning one or more existing directional components 31 of the audio content (e.g., one or more audio objects) into the at least one direction 232 away from the at least one other audio playback device. FIG. 8 shows that the apparent sound source 9 of the audio content, or at least the apparent sound source 19 of an above-threshold amount of the total energy of the audio content, is behind the user 1.

Alternatively, directional components 31 and diffuse components 29 can be switched. That is, information recorded in the directional components 31 can be distributed in a diffuse manner while information recorded in diffuse components 29 concentrated into a direction. This inversion of the intended spatialisation of the audio content is often unrealistic and thus will not be confused by the user 1 for the intended spatialisation. Thus, the user 1 will be more aware that they are being provided the user-perceivable indication.

Therefore, temporarily rendering the audio content with the at least one spatial characteristic can comprise, additionally or alternatively, converting at least one directional component 31 of the audio content in a direction corresponding to one or more positions 212 of the at least one other audio playback device 7, 11 into diffuse audio.

Temporarily rendering the audio content with the at least one spatial characteristic may comprise causing an above-threshold amount of the total energy of the audio content to be perceived as originating from more than one direction during the provision of the user-perceivable indication. An example is illustrated by FIG. 9.

The apparent sound source 19 of an above-threshold amount of the total energy of the audio content can be caused to be perceived as originating from two or more successive directions, at least one of which is a direction 232 away from the at least one other audio playback device 7, 11. At least one of the two or more successive directions may be a direction in which there are located no real sound sources associated with the at least one other audio playback device 7, 11 connected to the user device 5 and no possible virtual sound sources associated with the at least one other audio playback device 7, 11 connected to the user device 5.

The user-perceivable indication may be discontinued after directing an above-threshold amount of the total energy of the audio content into two or more successive directions, at least one of which is the at least one direction 232 away from the at least one other audio playback device 7, 11.

Figure 9:
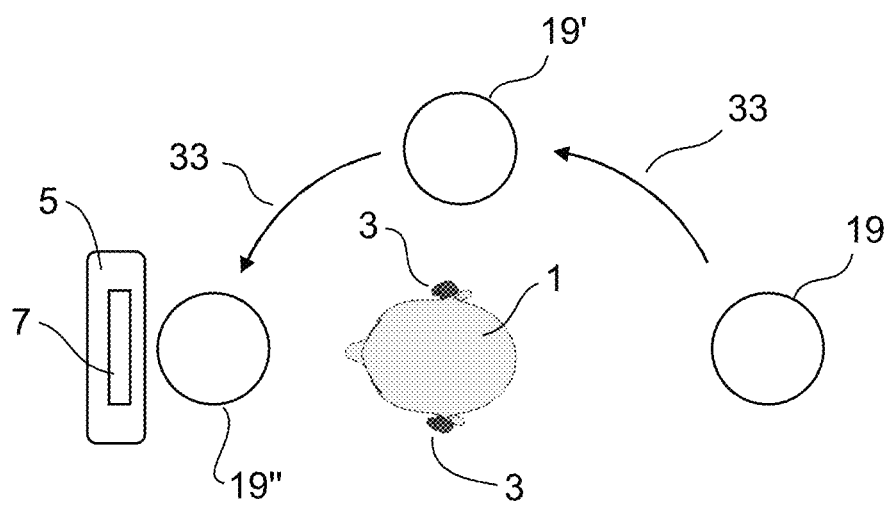
FIG. 9 shows an example of subject matter described herein.

In the example of FIG. 9 the apparent sound source 19 for an above-threshold amount of the total energy of the audio content is at first located behind the user 1 as in FIG. 6. Subsequently, the apparent sound source 19 is caused to change position and will be perceived as originating from the right-hand side of the user 1. The apparent sound source located to the right-hand side of the user 1 is referenced as 19'. At a time subsequent to this, the user-perceivable indication may be discontinued and the rendering of audio content continues with the intended spatialisation of its composer. This may, for example, and as illustrated in FIG. 9, result in an above-threshold amount of the total energy of the audio content being perceived as originating from in front of the user 1, from the direction of the user device 5 where accompanying visual content, if any, may be displayed. The apparent sound source located in front of the user 1 is referenced as 19".

In some examples, the user-perceivable indication may be in the form of a continuous movement, around the user, of an apparent sound source 19 for an above-threshold amount of the total energy of the audio content. The continuous movement may follow a trajectory referenced as 33 in FIG. 9.

This can be advantageous in cases where the audio playback device responsible for playback of the audio content is headphones 3. In contrast to the sound produced by headphones 3, the sound produced by loudspeakers 7, 11 will be coloured by room reflections and the perceived trajectory of the apparent sound source will generally not be as clear or consistent as that produced by headphones 3. This can be a further user-perceivable indication to the user 1 that the headphones 3 are responsible for playback of the audio content that they hear.

In other examples, the user-perceivable indication may be in the form of one or more discrete changes in a position of an apparent sound source 19 for an above-threshold amount of the total energy of the audio content.

The temporary rendering of the audio content with the at least one spatial characteristic may begin from the at least one direction 232 away from the at least one other audio playback device 7, 11 or may comprise a quick pan to this direction 232 from the intended direction in the intended spatialisation of the audio content.

Figure 10:
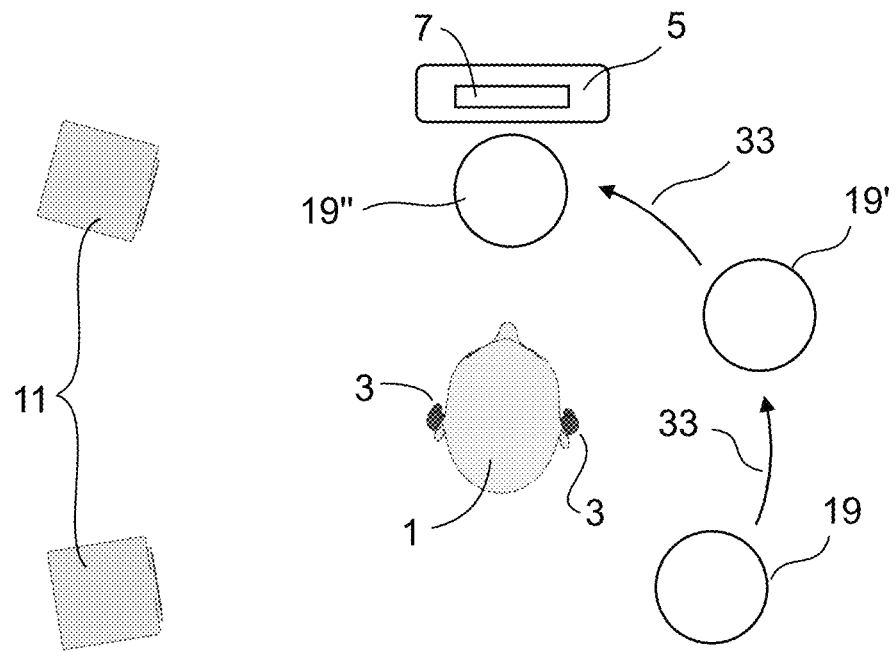
FIG. 10 shows an example of subject matter described herein.

FIG. 10 illustrates an example in which there are a plurality of other audio playback devices 7, 11 connected to the user device 5. In this example the user device 5 is connected to its own integrated loudspeaker 7, the headphones 3 that the user 1 is wearing, and a loudspeaker system 11 which may be a surround sound loudspeaker system. The audio playback device responsible for playback of the audio content is the headphones 3. The loudspeaker system 11 is positioned to the left-hand side of the user 1 and the user device 5 is positioned in front of the user 1. Directions which are away from the other audio playback devices 7, 11 connected to the user device 5 therefore include behind the user 1 and to the right-hand side of the user 1. If the loudspeaker system 11 is not configured for surround sound or is configured for planar surround sound rather than full-sphere surround sound, directions which are away from the other audio playback devices 7, 11 connected to the user device 5 may also include above and/or below the user's head.

As in the examples of FIGS. 6-9, in the example of FIG. 10 the headphones 3 worn by the user 1 are the audio playback device responsible for playback of the audio content that the user hears. The apparent sound source 19 of an above-threshold amount of the total energy of the audio content is at first located to the rear, right-hand side of the user's head, away from both the integrated loudspeaker 7 of the user device 5 and the surround sound loudspeaker system 11. In some examples this may be the only direction in which the apparent sound source 19 is located during the user-perceivable indication. In other examples, such as the one illustrated, the apparent sound source 19 is moved into at least one other direction which may also be away from the other audio playback devices 7, 11. As illustrated, the apparent sound source is subsequently located to the front, right-hand side of the user's head, away from the surround sound loudspeaker system 11. The apparent sound source located to the front, right-hand side of the user 1 is referenced as 19'. In this location the apparent sound source 19' is also not in the direction of the integrated loudspeaker 7 but it may be less clear to the user 1 that the apparent sound source 19' in this location cannot be reproduced by the integrated loudspeaker 7 in front of the user 1.

At a time subsequent to this, the user-perceivable indication may be discontinued and the rendering of audio content continues with the intended spatialisation of its composer. This may, for example, and as illustrated in FIG. 10, result in an above-threshold amount of the total energy of the audio content being perceived as originating from in front of the user 1, from the direction of the user device 5 where accompanying visual content, if any, may be displayed. The apparent sound source located in front of the user 1 is referenced as 19".

In some examples the trajectory 33 followed by the apparent sound source 19 may be more complex than that illustrated in FIGS. 9 and 10.

Figure 11:
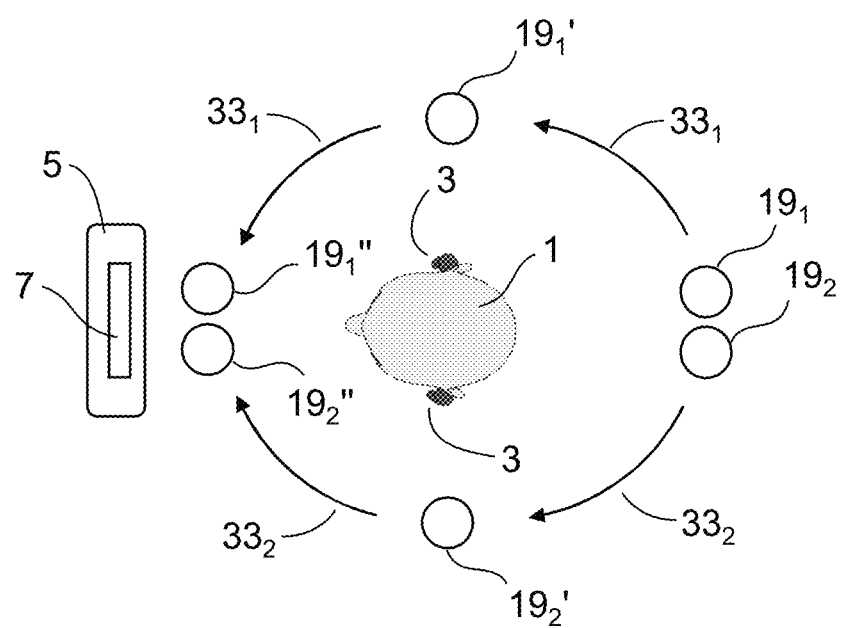
FIG. 11 shows an example of subject matter described herein.

FIG. 11 illustrates an example in which directional components of the audio content (or diffuse components whose directionality has been increased) which provide for the above-threshold amount of the total energy of the audio content are divided between two or more groups having associated directions which are differentially controllable. Components of the audio content comprised in a first group may have a first apparent sound source $19_1$ moving along a first trajectory $33_1$ and components of the audio content comprised in a second group may have a second apparent sound source $19_2$ moving along a second trajectory $33_2$, different to the first trajectory $33_1$.

In the example illustrated in FIG. 11, the first and second apparent sound sources $19_1$, $19_2$ are at first positioned behind the user 1. The first apparent sound source $19_1$ then moves around to the user's right-hand side (where it is referenced as $19_1'$) while the second apparent sound source $19_2$ moves around to the user's left-hand side (where it is referenced as $19_2'$).

Subsequently, the user-perceivable indication may be discontinued and both apparent sound sources $19_1$, $19_2$ are positioned in front of the user 1 (where they are referenced as $19_1"$ and $19_2"$ respectively), in the direction of the user device 5 where accompanying visual content, if any, may be displayed.

Figure 12:
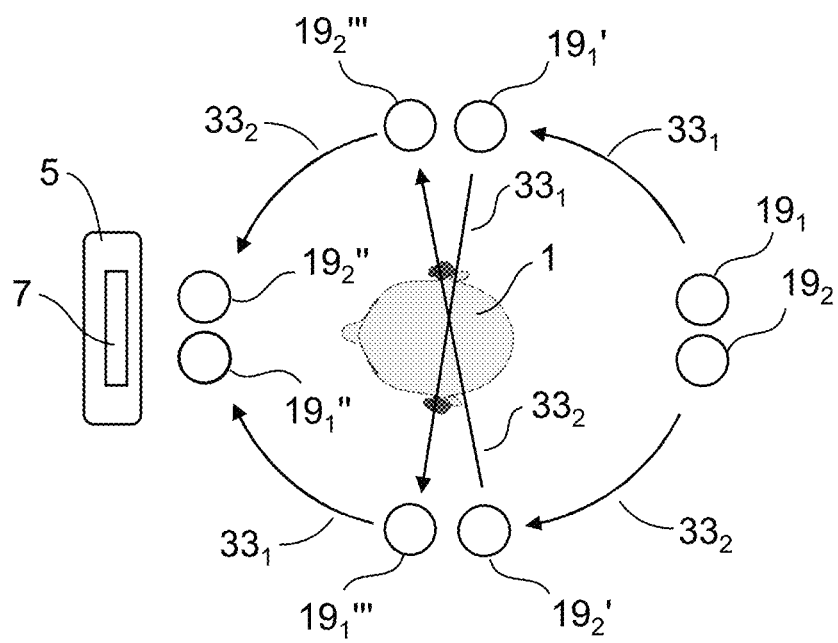
FIG. 12 shows an example of subject matter described herein.

Alternatively, before discontinuing the user-perceivable indication, for a still more complex trajectory, the first trajectory $33_1$ may comprise moving the first apparent sound source $19_1$ from the user's right-hand side to their left-hand side (where it is referenced as $19_1'''$) while the second trajectory $33_2$ may comprise moving the second apparent sound source $19_2$ from the user's left-hand side to their right-hand side (where it is referenced as $19_2'''$), as per the example illustrated in FIG. 12. This can be reversed and repeated. Such an unrealistic pattern of movement will not be confused by the user 1 for the intended spatialisation of the audio content and thus they will be more aware that they are being provided the user-perceivable indication.

Figure 13:
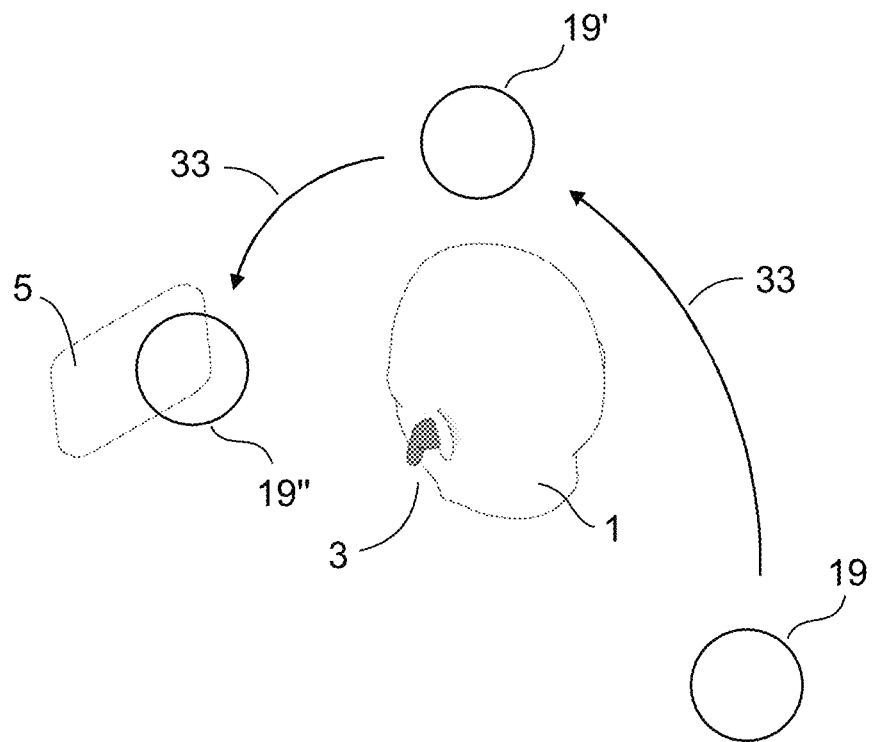
FIG. 13 shows an example of subject matter described herein.

FIG. 13 illustrates an example of a trajectory 33 of the apparent sound source 19 of an above-threshold amount of the total energy of the audio content in a different dimension. Rather than a trajectory of the apparent sound source in a horizontal plane around the user 1, as shown in FIGS. 9-12, the trajectory 33 of the apparent sound source 19 in the example of FIG. 13 takes it out of this plane. The apparent sound source 19 is at first located behind the user's head. The elevation of the apparent sound source 19 is then adjusted so that it is later located above the user's head (where it is referenced as 19'). In other examples the apparent sound source 19 may be located above the user's head from the beginning of the user-perceivable indication. At a time subsequent to this, the user-perceivable indication may be discontinued and the rendering of audio content continues with the intended spatialisation of its composer. This may, for example, and as illustrated in FIG. 13, result in an above-threshold amount of the total energy of the audio content being perceived as originating from in front of the user 1 (where it is referenced as 19"), from the direction of the user device 5 where accompanying visual content, if any, may be displayed.

Although in FIG. 13 a surround sound loudspeaker system 11, such as that shown in FIGS. 2 and 10, is not depicted, where such a loudspeaker system 11 is adapted for providing planar surround sound presentation, the trajectory 33 illustrated in FIG. 13 or simply the positioning of the apparent sound source 19 at a location out of a horizontal plane around the user's head, such as above their head, can provide a clear user-perceivable indication that the audio playback device capable of, for example, full-sphere surround sound is the one responsible for playback of the audio content.

On the other hand, where such a loudspeaker system 11 is adapted for providing full-sphere surround sound presentation, positioning of the apparent sound source 19 at a location out of a horizontal plane around the user's head may not enable the user 1 to identify that another audio playback device capable of full-sphere surround sound presentation, such as the headphones 3 they are wearing, is responsible for playback of the audio content. As previously mentioned, however, the clarity of the perceived trajectory of the apparent sound source 19 provided by headphones 3 can enable the user 1 to differentiate between sound produced by the headphones 3 and sound produced by the loudspeaker system 11. Thus, the trajectory 33 of the apparent sound source 19 illustrated in FIG. 13 can be used as the user-perceivable indication in these circumstances.

Figure 14:
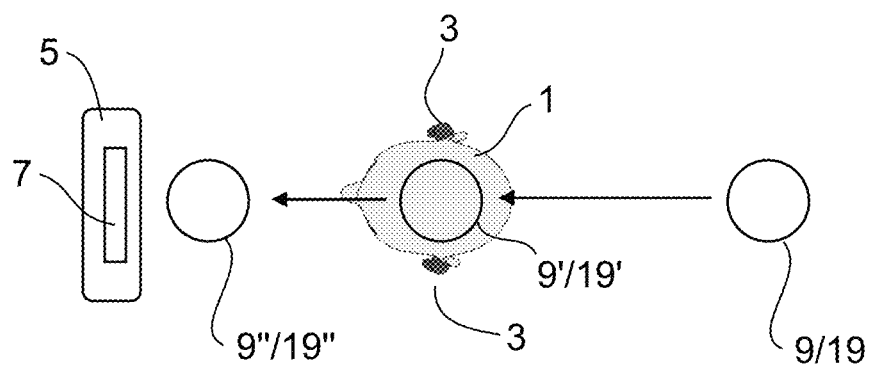
FIG. 14 shows an example of subject matter described herein.

An alternative, or addition, is to temporarily render (downmix) spatial audio components in mono or stereo format. Rendering spatial audio components in mono or stereo format provides a head-internalisation effect of the apparent sound source 9 of the audio content, or at least the apparent sound source 19 of an above-threshold amount of the total energy of the audio content, which is an example of a spatial characteristic which cannot be reproduced by the at least one other audio playback device 7, 11, where the at least one other audio playback device 7, 11 is not headphones 3. A head-internalisation effect is where the apparent sound source of the audio content, or at least part of the audio content will not be perceived as originating from a location removed from their head. The head-internalisation of the apparent sound source is referenced as 9'/19' in FIG. 14. In the example of FIG. 14 the apparent sound source 9 or 19 is at first located behind the user's head. The spatial audio effect is then removed by rendering spatial audio components of the audio content in mono or stereo format. This can be reversed and repeated. Such an unrealistic pattern of movement will not be confused by the user 1 for the intended spatialisation of the audio content and thus they will be more aware that they are being provided the user-perceivable indication.

It is also to be appreciated that the apparent sound source 9/19 does not need to be moved and the audio content can instead be temporarily played back in mono or stereo format from the beginning of the user-perceivable indication until the cessation of the user-perceivable indication.

Another alternative, or addition, for temporarily rendering the audio content with a spatial characteristic which cannot be reproduced by other audio playback devices 7, 11—which project sound into a real room so that the user 1 hears any sounds produced with coloration, such as reverberation effects and reflections, based on the room characteristics—is to apply to the audio content a room impulse response (RIR) which does not match the room characteristics or to adjust a RIR applied to the audio content in a noticeable manner over the duration of the user-perceivable indication. In some examples, for example to indicate to the user 1 that playback of the audio content is via headphones 3, the RIR that would otherwise be added during binauralisation of the audio content is temporarily removed so that audio content heard by the user during the user-perceivable indication does not appear as if it has been projected into a room. This will rule out a perception that audio playback devices 7, 11 at a remote location from the user 1 could have been responsible for playback of the audio content.

In some examples not all components of the audio content are available for indicating to the user 1 that the audio playback device 3 is responsible for playback of the audio content. The intended spatialisation of the audio content can be recorded in associated metadata. Components of the audio content which are flagged in the associated metadata as being components which should not be modified or as being components for which rendering should not be adjusted are not modified or adjusted during the user-perceivable indication. They retain their intended spatialisation throughout the duration of the user-perceivable indication. An example is shown in FIGS. 15A, B.

FIG. 15A illustrates an example of the intended spatialisation of two components of the audio content. In this example apparent sound sources 35, 37 of the two components are located in front of the user 1, in the direction of the user device 5. A first of these is the apparent sound source 35 for a component which is flagged in the accompanying metadata and is accordingly made unavailable for the user-perceivable indication. A second of these is the apparent sound source 37 for a component which is not so flagged.

FIG. 15B illustrates an example of a user-perceivable indication caused by temporarily rendering the audio content comprising these two components with at least one spatial characteristic which cannot be reproduced by the at least one other audio playback device connected to the user device—in this case the integrated loudspeaker 7 of the user device 5. The apparent sound source 35 for the component which is flagged in the accompanying metadata retains its intended spatialisation. The apparent sound source for the component which is not so flagged is located behind the user 1, on the opposite side of the user's head as compared to the relative position of integrated loudspeaker 7 with respect to the user 1, and where there are no real or possible virtual sound sources associated with the integrated loudspeaker 7. The apparent sound source of the non-flagged components in this location behind the user 1 is referenced as 37'.

In some examples, and as shown in FIG. 15B, the energy associated with the component of the audio content, which is perceived to originate from this at least one direction 232 away from the at least one other audio playback device 7, 11, is increased. Because the spatialisation is now distributed between an expected and an unexpected direction, to emphasise the direction away 232 from the integrated loudspeaker 7, and thus the spatial characteristic which cannot be reproduced by the integrated loudspeaker 7, the energy of the apparent sound source 37' located in the direction 232 away from the integrated loudspeaker 7 is increased. It may be increased to cause an above-threshold amount of the total energy of the audio content to be located in the direction 232 away from the integrated loudspeaker 7. It is to be appreciated that this is not essential and in other examples the energy of apparent sound source 37' located in the direction 232 away from the integrated loudspeaker 7 is not modified compared to that which is otherwise intended in the absence of the user-perceivable indication.

In some examples, where the metadata flags a component of the audio content as being unavailable for the user-perceivable indication, the metadata can identify another component of the audio content to be modified in place of the flagged component.

The components of the audio content which are available for the indication can be flagged by the original content composer or by the user 1. The user 1 may select individual components (e.g., audio objects) that they do not wish to be part of the indication or, if the metadata categorises the components as, for example, "speech" or "surround effects", the user 1 may select categories that they do not wish to be part of the indication. The selection by the user 1 can be made in respect of the current playback of the current audio content or can be made as a setting to be applied to future audio content playback.

FIG. 16 schematically illustrates an apparatus 40 according to examples of the disclosure. The apparatus 40 illustrated in FIG. 16 may be a chip or a chip-set. In some examples the apparatus 40 may be provided within the user device or the audio playback device.

The apparatus 40 comprises a controller 42. Implementation of a controller 42 may be as controller circuitry. The controller 42 may be implemented in hardware alone, have certain aspects in software including firmware alone or can be a combination of hardware and software (including firmware).

As illustrated in FIG. 16 the controller 42 may be implemented using instructions that enable hardware functionality, for example, by using executable instructions of a computer program 48 in a general-purpose or special-purpose processor 44 that may be stored on a computer readable storage medium (disk, memory etc.) to be executed by such a processor 44.

The processor 44 is configured to read from and write to the memory 46. The processor 44 may also comprise an output interface via which data and/or commands are output by the processor 44 and an input interface via which data and/or commands are input to the processor 44.

The memory 46 stores a computer program 48 comprising computer program instructions (computer program code) that controls the operation of the apparatus 40 when loaded into the processor 44. The computer program instructions, of the computer program 48, provide the logic and routines that enables the apparatus to perform the methods illustrated and described in relation to the preceding FIGS. The processor 44 by reading the memory 46 is able to load and execute the computer program 48.

The apparatus 40 therefore comprises: at least one processor 44; and at least one memory 46 including computer program code, the at least one memory 46 and the computer program code configured to, with the at least one processor 44, cause the apparatus 40 at least to perform: causing a user-perceivable indication that the audio playback device is responsible for playback of audio content received from the user device by temporarily rendering the audio content with at least one spatial characteristic which cannot be reproduced by at least one other audio playback device connected to the user device.

The computer program 48 may arrive at the apparatus 40 via any suitable delivery mechanism 50. The delivery mechanism 50 may be, for example, a machine-readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 48. The delivery mechanism may be a signal configured to reliably transfer the computer program 48. The apparatus 40 may propagate or transmit the computer program 48 as a computer data signal.

Computer program instructions for causing an apparatus to perform at least the following or for performing at least the following: causing a user-perceivable indication that the audio playback device is responsible for playback of audio content received from the user device by temporarily rendering the audio content with at least one spatial characteristic which cannot be reproduced by at least one other audio playback device connected to the user device.

The computer program instructions may be comprised in a computer program, a non-transitory computer readable medium, a computer program product, a machine-readable medium. In some but not necessarily all examples, the computer program instructions may be distributed over more than one computer program.

Although the memory 46 is illustrated as a single component/circuitry it may be implemented as one or more separate components/circuitry some or all of which may be integrated/removable and/or may provide permanent/semi-permanent/dynamic/cached storage.

Although the processor 44 is illustrated as a single component/circuitry it may be implemented as one or more separate components/circuitry some or all of which may be integrated/removable. The processor 44 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated and described in relation to the preceding FIGS may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

Consequently, in some examples, the apparatus 40 comprises means for: causing a user-perceivable indication that the audio playback device is responsible for playback of audio content received from the user device by temporarily rendering the audio content with at least one spatial characteristic which cannot be reproduced by at least one other audio playback device connected to the user device.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to 'comprising only one' or by using 'consisting'.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. An apparatus comprising:
   at least one processor; and
   at least one memory storing instructions that, when executed by the at least one processor, cause the apparatus at least to:
   cause an audio playback device to temporarily provide a user-perceivable indication that the audio playback device is responsible for playback of audio content received from a user device, comprising causing the audio playback device to temporarily render the audio content with at least one spatial characteristic which cannot be reproduced with at least one other audio playback device connected to the user device; and
   cause playback of the audio content to be provided with the audio playback device, and not the at least one other audio playback device, after the user-perceivable indication has ended.

2. The apparatus as claimed in claim 1, wherein causing the audio playback device to temporarily render the audio content with the at least one spatial characteristic comprises the at least one memory storing instructions that, when executed by the at least one processor, cause the apparatus to at least one of:
   cause the audio playback device to temporarily adjust rendering of the audio content so that it is rendered with the at least one spatial characteristic, or
   cause the audio playback device to temporarily modify the audio content so that it has the at least one spatial characteristic.

3. The apparatus as claimed in claim 1, wherein causing the audio playback device to temporarily render the audio content with the at least one spatial characteristic comprises the at least one memory storing instructions that, when executed by the at least one processor, cause the apparatus to:
   cause the audio playback device to cause an increase in energy that a user perceives to be originating from at least one direction away from the at least one other audio playback device relative to energy that the user perceives to be originating from one or more directions corresponding to one or more positions of the at least one other audio playback device.

4. The apparatus as claimed in claim 3, wherein the at least one direction away from the at least one other audio playback device comprises a direction in which there is no real sound source associated with the at least one other audio playback device and no possible virtual sound source associated with the at least one other audio playback device.

5. The apparatus as claimed in claim 1, wherein causing the audio playback device to temporarily render the audio content with the at least one spatial characteristic comprises the at least one memory storing instructions that, when executed by the at least one processor, cause the apparatus to:
   cause the audio playback device to cause an above-threshold amount of total energy of the audio content to be directed in at least one direction away from the at least one other audio playback device.

6. The apparatus as claimed in claim 5, wherein the at least one stores memory instructions that, when executed by the at least one processor, cause the apparatus to:
   cause the audio playback device to discontinue the user-perceivable indication in response to directing an above-threshold amount of the total energy of the audio content into two or more successive directions, at least one of which being the at least one direction away from the at least one other audio playback device.

7. The apparatus as claimed in claim 1, wherein causing the audio playback device to temporarily render the audio content with the at least one spatial characteristic comprises the at least one memory storing instructions that, when executed by the at least one processor, cause the apparatus to:
   cause the audio playback device to reposition one or more audio objects to at least one direction away from the at least one other audio playback device.

8. The apparatus as claimed in claim 1, wherein causing the audio playback device to temporarily render the audio content with the at least one spatial characteristic comprises the at least one memory storing instructions that, when executed by the at least one processor, cause the apparatus to:
   cause the audio playback device to convert at least one diffuse component of the audio content to directional audio in at least one direction away from the at least one other audio playback device.

9. The apparatus as claimed in claim 1, wherein causing the audio playback device to temporarily render the audio content with the at least one spatial characteristic comprises the at least one memory storing instructions that, when executed by the at least one processor, cause the apparatus to:
   cause the audio playback device to convert at least one directional component of the audio content in a direction corresponding to a position of another audio playback device into diffuse audio.

10. The apparatus as claimed in claim 1, wherein causing the audio playback device to temporarily render the audio content with the at least one spatial characteristic comprises the at least one memory storing instructions that, when executed by the at least one processor, cause the apparatus to at least one of:
   cause the audio playback device to decrease energy of at least one directional component of the audio content in a direction corresponding to a position of the at least one other audio playback device, or
   cause the audio playback device to increase the energy of the at least one directional component of the audio content in at least one direction away from the at least one other audio playback device.

11. The apparatus as claimed in claim 1, wherein causing the audio playback device to temporarily render the audio content with the at least one spatial characteristic comprises the at least one memory storing instructions that, when executed by the at least one processor, cause the apparatus to:
   cause the audio playback device to render spatial audio components in mono format or stereo format.

12. The apparatus as claimed in claim 1, wherein the at least one memory stores instructions that, when executed by the at least one processor, further cause the apparatus to:
   cause the audio playback device to temporarily render the audio content with the at least one spatial characteristic in response to at least one of:
   a change of responsibility for playback of the audio content among audio playback devices connected to the user device, or
   a user request for confirmation that the audio playback device is responsible for playback of the audio content.

13. The apparatus as claimed in claim 1, wherein components of the audio content that are flagged, in associated metadata, as components which should not be modified, are not modified.

14. The apparatus as claimed in claim 1, wherein said user-perceivable indication that the audio playback device is responsible for playback of the audio content received from the user device is caused in the apparatus.

15. The apparatus as claimed in claim 1, wherein said user-perceivable indication that the audio playback device is responsible for playback of the audio content received from the user device is caused in another apparatus.

16. A method comprising
   causing an audio playback device to temporarily provide a user-perceivable indication that the audio playback device is responsible for playback of audio content received from a user device, comprising causing the audio playback device to temporarily render the audio content with at least one spatial characteristic which cannot be reproduced with at least one other audio playback device connected to the user device; and
   causing playback of the audio content to be provided with the audio playback device, and not the at least one other audio playback device, after the user-perceivable indication has ended.

17. The method as claimed in claim 16, wherein causing the audio playback device to temporarily render the audio content with the at least one spatial characteristic comprises:
   causing the audio playback device to cause an above-threshold amount of total energy of the audio content to be directed in at least one direction away from the at least one other audio playback device; and
   wherein the method further comprises:
   causing the audio playback device to discontinue the user-perceivable indication in response to directing an above-threshold amount of the total energy of the audio content into two or more successive directions, at least one of which being the at least one direction away from the at least one other audio playback device.

18. The method as claimed in claim 16, further comprising:
   causing the audio playback device to temporarily render the audio content with the at least one spatial characteristic in response to at least one of:
   a change of responsibility for playback of the audio content among audio playback devices connected to the user device, or
   a user request for confirmation that the audio playback device is responsible for playback of the audio content.

19. The method as claimed in claim 16, wherein components of the audio content that are flagged, in associated metadata, as components which should not be modified, are not modified.

20. A non-transitory computer readable medium comprising program instructions stored thereon for performing at least the following:
   causing an audio playback device to temporarily provide a user-perceivable indication that the audio playback device is responsible for playback of audio content received from a user device, comprising causing the audio playback device to temporarily render the audio content with at least one spatial characteristic which cannot be reproduced with at least one other audio playback device connected to the user device; and
   causing playback of the audio content to be provided with the audio playback device, and not the at least one other audio playback device, after the user-perceivable indication has ended.

21. The non-transitory computer readable medium of claim 20, wherein the program instructions stored thereon for causing the audio playback device to temporarily render the audio content with the at least one spatial characteristic are further for performing:
   causing the audio playback device to cause an above-threshold amount of total energy of the audio content to be directed in at least one direction away from the at least one other audio playback device; and wherein the program instructions are further for performing:

causing the audio playback device to discontinue the user-perceivable indication in response to at least one of:

directing an above-threshold amount of the total energy of the audio content into two or more successive directions, at least one of which being the at least one direction away from the at least one other audio playback device, or a received acknowledgement of the user-perceivable indication.

22. The non-transitory computer readable medium of claim 20, wherein the program instructions are further configured for performing:

causing the audio playback device to temporarily render the audio content with the at least one spatial characteristic in response to at least one of:

a change of responsibility for playback of the audio content among audio playback devices connected to the user device, or a user request for confirmation that the audio playback device is responsible for playback of the audio content.

* * * * *